United States Patent [19]

Wakayama et al.

[11] Patent Number: 5,186,423
[45] Date of Patent: Feb. 16, 1993

[54] FALLABLE TYPE POLE SUPPORTING DEVICE

[75] Inventors: Hajime Wakayama; Toru Shimakura; Seiji Watanabe; Akio Handa, all of Saitama, Japan

[73] Assignee: Honda Giken Kogyo Kabushiki Kaisha, Tokyo, Japan

[21] Appl. No.: 553,875

[22] Filed: Jul. 16, 1990

[30] Foreign Application Priority Data

Jul. 14, 1989 [JP] Japan ................................ 1-82274[U]

[51] Int. Cl.$^5$ .......................................... F16M 13/00
[52] U.S. Cl. .................................... 248/160; 248/534; 267/159
[58] Field of Search ............... 248/160, 274, 534, 573; 267/159

[56] References Cited

U.S. PATENT DOCUMENTS

| | | |
|---|---|---|
| 1,313,616 | 8/1919 | Walsh ............................. 248/160 X |
| 1,435,363 | 11/1922 | Wood ............................. 248/160 X |
| 1,679,623 | 8/1928 | Olsen ............................. 248/160 |
| 1,726,817 | 9/1929 | Franklin ........................ 248/160 X |
| 1,739,915 | 12/1929 | Sanders . |
| 2,094,475 | 9/1937 | Schwarzhaupt ................ 248/160 |
| 2,604,316 | 7/1952 | O'Brien et al. ................. 267/159 |
| 2,748,745 | 9/1954 | Pobanz et al. . |
| 2,914,988 | 12/1959 | O'Shei ............................ 248/160 X |
| 2,978,217 | 4/1961 | Gunderson ..................... 248/160 |
| 3,011,810 | 12/1961 | Crowder . |
| 3,438,651 | 5/1967 | Hertoghe et al. . |
| 3,878,810 | 4/1075 | Conrad . |
| 3,947,059 | 3/1976 | Gillilan, Jr. . |
| 4,103,924 | 8/1978 | Suhm . |
| 4,157,075 | 6/1979 | Kirvutza . |
| 4,574,726 | 3/1986 | Sullivan . |
| 4,598,339 | 7/1986 | Ainsworth . |
| 4,601,255 | 7/1986 | Marcotti . |
| 4,619,219 | 10/1986 | Millard . |
| 4,632,354 | 12/1986 | Asciutto . |
| 4,869,552 | 9/1989 | Tolleson et al. ................ 248/160 X |

FOREIGN PATENT DOCUMENTS 52-7600 1/1977 Japan .
160443 12/1981 Japan ................................ 248/573

Primary Examiner—David L. Talbott
Attorney, Agent, or Firm—Irving M. Weiner; Joseph P. Carrier; Pamela S. Burt

[57] ABSTRACT

The present invention discloses a fallable type pole supporting device comprising a wire extending in a longitudinal direction of a pole extended to a mounting side end of a pole member. A resilient member is disposed between an extreme end of the wire and a mounting side end of the pole member. The pole member and the longitudinal direction of the wire are maintained in a straight line by a resilient force in an axial direction of the resilient member. A lower mounting end of the pole member is tiltably maintained and the pole member is made engageable with a base body through said wire.

8 Claims, 2 Drawing Sheets

FALLABLE TYPE POLE SUPPORTING DEVICE

BACKGROUND OF THE INVENTION

1. Field of the Invention

The present invention relates to a fallable type pole supporting device suitable for mounting a fallable pole having a position confirming flag on an upper end thereof, such as used when traveling forests, wasteland, etc. in an off-road vehicle, or for mounting a pole-like member such as an antenna.

2. Description of Relevant Art

A confirming flag for a vehicle, in which a pole having a flag at an upper portion thereof is mounted at its lower portion on a vehicle body, has been heretofore known.

As disclosed in Japanese Utility Model Application Laid-Open Publication No. 52-7600, a known confirming flag of this kind comprises a pole, a piece of flag-cloth attached to an upper portion of the pole, and fittings for the vehicle body mounted to a lower portion of the pole.

In the aforesaid publication, in the event the pole engages an obstacle, a shock is absorbed by elastic deformation of the pole, and therefore, a great force acts on the fittings at the lower portion of the pole. Thus, it was necessary to provide a sufficient rigidity of the mounting fittings to withstand such great force. In this regard, however, there was an inconvenience that when the pole is once disengaged from the mounting fittings, a connecting state relative to the vehicle body disappears, and as a result, the pole will be lose during traveling.

SUMMARY OF THE INVENTION

The present invention has been accomplished in order to solve the aforesaid problems.

It is an object of the present invention to provide a fallable type pole supporting device for a vehicle which can be elastically deformed without exerting a great force on a mounting portion of the vehicle body even if a pole supported by the device engages an obstacle during traveling.

Another object of the invention is to provide such a device which prevents the pole from becoming fully disengaged from the vehicle body.

For achieving the aforesaid objects, the device of the present invention is characterized in that a wire extending in a longitudinal direction of a pole is fixed to a mounting side end of a pole member, a resilient member is disposed between an extreme end of said wire and said mounting side end of the pole member, said pole member and the longitudinal direction of the wire are normally maintained in a straight line by a resilient force in an axial direction of said resilient member, the mounting side end of said pole member is tiltably supported by the resilient member, and said pole member is secured to a base body through said wire.

With the arrangement as described above, when the pole as mounted on an off road vehicle engages an obstacle, the pole is flexed and tilted. In this state, the longitudinal direction of the wire is deviated from the longitudinal direction of the pole member. Therefore, in order to absorb such deviation and restore it to a straight line with the pole, the wire is pulled back by the resilient force in an axial direction of the resilient member, and the pole member is again stood upright from its tilted state.

Moreover, since the pole member is secured to the vehicle body by the wire, even if the pole member is significantly tilted, such as in a vehicle rollover, the pole member will not be disengaged from the vehicle body.

Other objects, advantages and salient features of the present invention will be understood from the following detailed description which, when taken into conjunction with the annexed drawings, discloses preferred embodiments of the present invention.

DETAILED DESCRIPTION OF PREFERRED EMBODIMENTS

Embodiments of the present invention will be described in detail with reference to the drawings.

Figure 2:
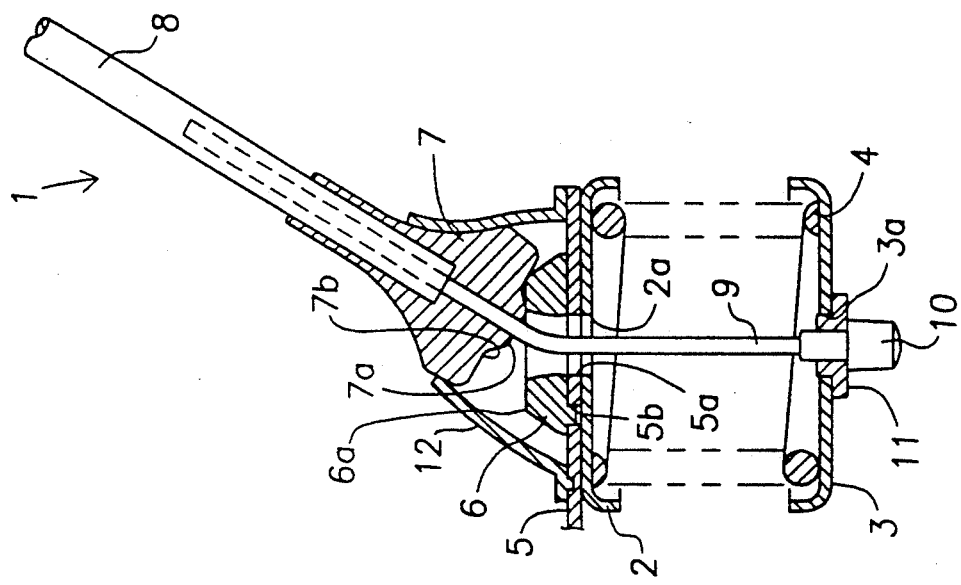
FIG. 2 is a sectional view similar to FIG. 1, but showing a state where the pole of FIG. 1 is tilted.
Figure 1:
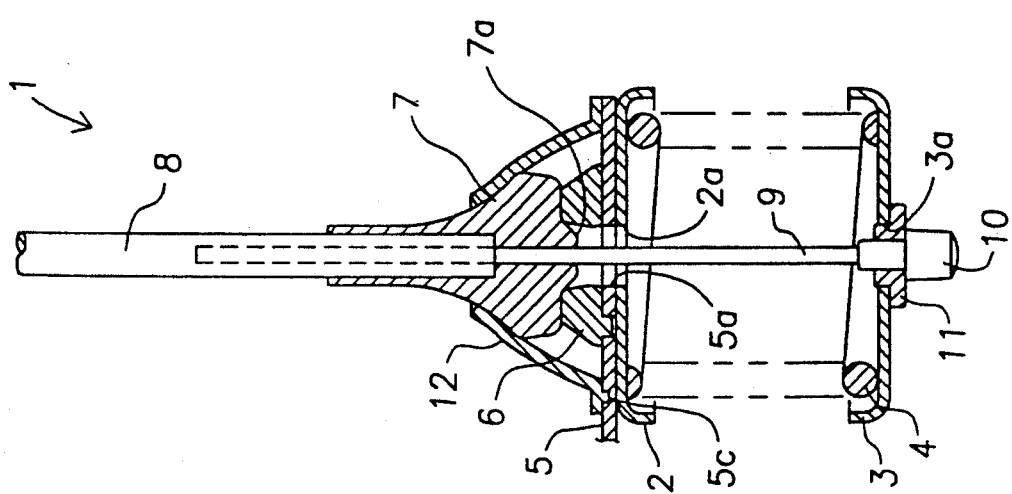
FIG. 1 is a sectional view showing one preferred embodiment of a fallable pole supporting device according to the present invention.

Referring to FIGS. 1 and 2, the reference numerals designate the following: 1 a fallable type flag pole; 2, 3 upper and lower spring seats, respectively; 4 a return spring; 5 a mounting plate mounted on the upper spring seat 2; 6 an annular pedestal provided on the mounting plate 5; 7 a tilting member tiltably provided on the pedestal 6; 8 a flexible pole provided on the tilting member 7; 9 a wire or cable mounted integrally with the pole 8; 10 a fixed element secured to one end of the wire 9; 11 a washer; and 12 a rubber boot having one end adhered to the mounting plate 5 surrounding the tilting member 7.

Each of the upper and lower spring seats 2 and 3 is in the form of a plate. The lower spring seat 3 is provided in its central portion with a hole 3a into which the washer 11 is fitted, and the upper spring seat 2 is provided in its central portion with a hole 2a through which the wire 9 extends.

One end of the mounting plate 5 is mounted on a part of a frame of the vehicle, and the other end of the mounting plate 5 is formed with a hole 5a through which the wire 9 also extends. The mounting plate is also formed with a plurality of small holes (one of which is shown at 5b) in which projections on the bottom surface of the pedestal 6 are fitted, and with a plurality of small recesses (one of which is shown at 5c) in which projections on the bottom surface of the rubber boot 12 are fitted.

The pedestal 6 is constructed in the form of a seat in which the upper surface allows the tilting member 7 to be seated, while the plurality of projections on the bottom surface of the pedestal are fitted in and mounted to the plurality of the small holes 5b in the mounting plate 5.

The tilting member 7 has a convex portion 7a tiltably fitted in the upper surface of the pedestal 6, and a concave portion 7b which cooperates with a convex portion 6a of the pedestal 6 for facilitating tilting movement of a tilting member. Also, one end of the pole 8 and one end of the wire 9 mounted integrally with the pole 8 are provided in an opening defined along the center line of the tilting member 7. The pole 8 is preferably formed of resin, but can be formed of metal or other appropriate materials. One end of the wire 9 is integrally molded at the lower end of the pole 8, and a flag is detachably mounted on the upper end of the pole 8.

In assembling the fallable flag pole 1, the return spring 4 is provided between the upper and lower spring seats 2 and 3, the tilting member 7 is placed on the pedestal 6, and the extreme end of the wire 9 is projected downwardly out of the hole 3a of the lower spring seat 3. In this state, the washer 11 is passed through the extreme end of the wire, the spring 4 is compressed to an extent and the fixed element 10 is fixed to the extreme end of the wire.

As thus assembled, the pole 8 is maintained straight since the wire 9 is strongly pulled by the resilient force of the return spring 4.

When the pole 8 engages an obstacle during traveling (with the mounting plate 5 mounted on the vehicle) the pole 8 is flexed and tilted as shown in FIG. 2, the upper surface of the pedestal 6 is pressed by the tilting member 7 which tilts with the pole 8, and the wire 9 is pulled thereby further compressing the spring 4. Therefore, a distance between the upper and lower spring seats 2 and 3 is narrowed against the resilient force of the return spring 4. Then, when the pole passes out of engagement with the obstacle, the wire 9 is pulled back by the resilient force of the return spring 4, the convex portion 7a of the tilting member 7 is fitted back into the seating surface of the pedestal 6 and the pole 8 is again stood upright.

Figure 3:
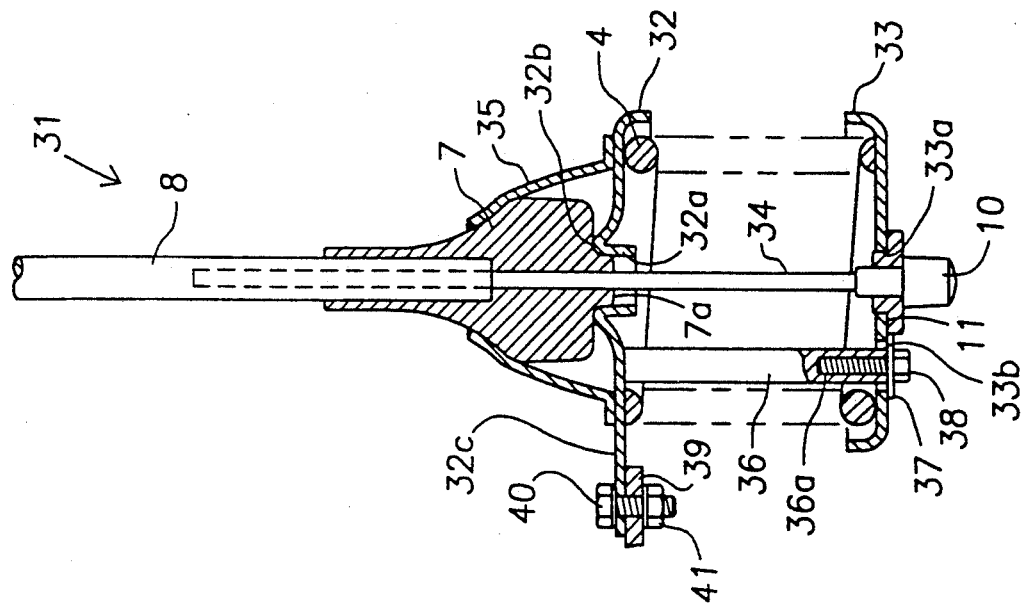
FIG. 3 is a sectional view showing a further preferred embodiment of a fallable type pole supporting device according to the present invention.

FIG. 3 shows a second embodiment, in which reference numeral 31 designates a fallable flag pole, and 4, 7, 8, 10 and 11 are elements similar to those of the first embodiment. Additional reference numerals designate the following: 32 and 33 upper and lower springs seats, respectively; 34 a wire, 35 a rubber boot, 36 a stopper shaft welded to the spring seat 32; 37 a flat washer, 38 a bolt, 39 fittings, 40 a bolt, and 41 a nut.

The upper spring seat 32 is provided with a hole 32a through which the wire 34 extends. An upper peripheral edge of spring seat 32 defining the hole 32a projects upwardly to define a seat surface 32b. The convex portion 7a of the tilting member 7 is fitted in the hole 32a and the seat surface 32b so that the former may be tiltably seated. One end of an arm 32c formed integrally with the upper spring seat 32 is provided with a mounting hole through which the bolt 40 passes. One end of the stopper shaft 36 is welded to the lower surface of the upper seat 32 in the vicinity of the hole 32a, and the other end of the shaft 36 is bored with a female thread 36a meshed with the bolt 38.

The lower spring seat 33 is in the form of a plate. The lower spring seat 33 is provided in its central portion with a hole 33a into which the washer 11 is fitted and a hole 33b for guiding the stopper shaft 36 is provided in the vicinity of the hole 33a.

In assembling the fallable type flag pole 31, the return spring 4 is provided between the upper and lower spring seats 32 and 33, the tilting member 7 is provided on the upper spring seat 32, the spring 4 is compressed to an extent, and the extreme end of the wire 34 is projected out of the hole 33a of the lower spring seat 33. In this state, the extreme end of the wire 34 passes through the washer 11, and the fixed element 10 is fixed to the wire and fitted in the guide hole 33a of the lower spring seat 33, and the bolt 38 is meshed with the threaded portion 36a through the flat washer 37.

As thus assembled, the pole 8 is maintained straight since the wire 34 is strongly pulled by the resilient force of the return spring 4.

In the fallable flag pole 31 for the vehicle, one end of the arm 32c formed integrally with the upper spring seat 32 is mounted on one end of the fittings 39 by means of bolt 40 and nut 41, while an opposite end of the fittings is welded or otherwise fixed to the frame of the vehicle. When the pole 8 engages an obstacle during the travel of the vehicle, the pole 8 is flexed and tilted, the convex portion 7a of the tilting member 7 presses the seat surface 32b of the upper spring seat 32, the wire 34 is pulled, and the distance between the upper and lower spring seats 32 and 33 is narrowed against the resilient force of the return spring 4. At this time, the lower spring seat 33 is guided by the stopper shaft 36. After the pole 8 is out of engagement with the obstacle, the wire 34 is pulled back by the resilient force of the return spring 4, the convex portion 7a of the tilting member 7 is fitted into the hole 32a of the upper spring seat 32, and the pole 8 is again stood upright.

In this embodiment, even if the wire 34 is broken or severed when the pole 8 is largely tilted, the lower spring seat 33 will be held by the plate washer 37 and bolt 38 provided on the stopper shaft 36. Accordingly, if the wire 34 is severed all components of the flag pole and supporting device will remain attached to the vehicle.

Figure 4:
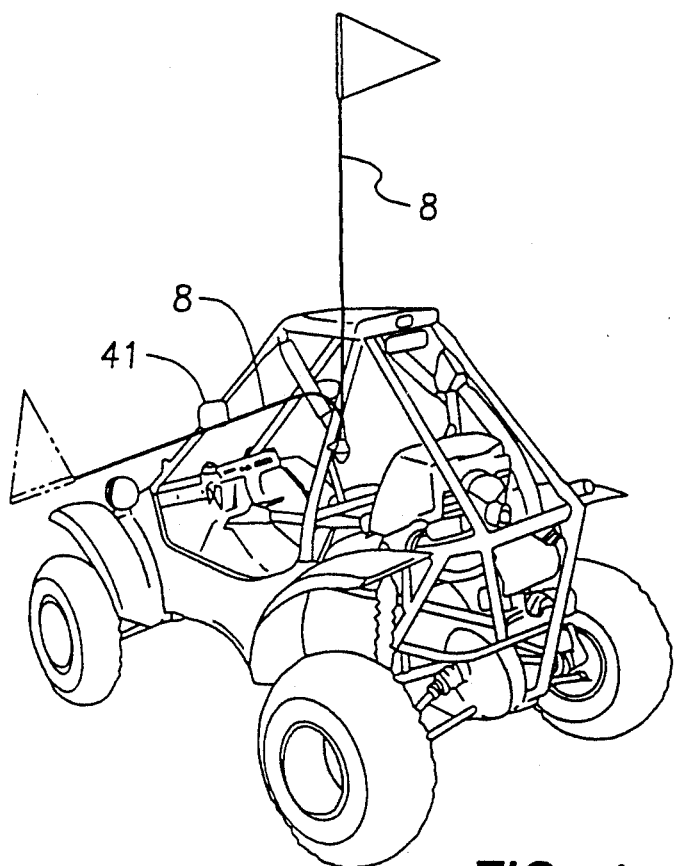
FIG. 4 is a perspective view showing a fallable type pole supporting device according to FIGS. 1 or 3 mounted on a buggy type off road vehicle.

In the fallable flag pole, as shown in FIG. 4, one end of the arm 32c of the upper spring seat 32 (or of a mounting plate such as shown at 5 in FIG. 1) is mounted on the fittings 39 welded to the frame of the vehicle. During travel of the vehicle, the pole 8 is normally stood upright by the supporting device, and when the vehicle is moved into a garage the pole 8 may be bent against the resiliency of the spring 4 and maintained in such bent position by a mirror 41 or a catch device provided for such purpose. As shown in FIG. 4, the pole supporting device is mounted on the off-road vehicle at a higher level than the mirror or catch device, so that when the pole 8 is in the bent position it extends downwardly toward the mirror.

Figure 5:
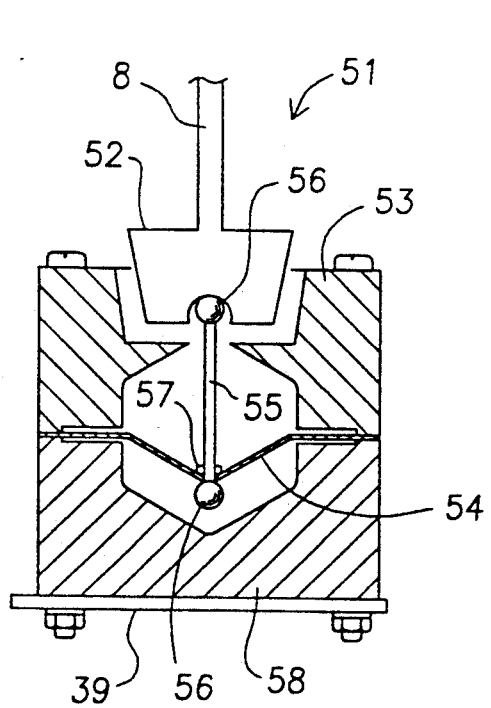
FIGS. 5 and 6 are respective explanatory views showing another preferred embodiment of a fallable type pole supporting device according to the present invention.
Figure 6:
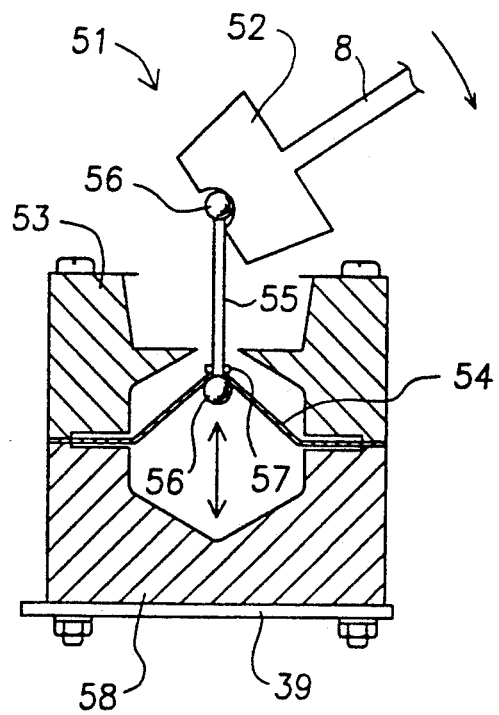

FIGS. 5 and 6 are respectively explanatory views showing another embodiment of a fallable type pole supporting device according to the present invention. In the drawings, reference numeral 51 designates a fallable type flag pole; 52 a tilting member provided on the pole 51; 53 a pedestal; 54 a plate spring; 55 a connecting rod; 56, 56 stoppers for the plate spring 54 secured to opposite ends of the connecting rod 55; 57 a stopper on the reset side for the plate spring 54 secured onto the connecting rod 55; and 58 mounting bed.

The plate spring 54 may be selectively invertedly formed into a concave shape or a convex shape in its central portion by applying an appropriate load to opposite sides thereof. The plate spring is sandwiched between the pedestal 53 and the mounting bed 58 at the peripheral edge thereof using the bolt and nut fasteners as shown, while fittings 39 have one end secured to the mounting bed 58 by the same fasteners, and an unshown end of the fittings 39 would be secured to the vehicle.

The connecting rod 55 connects the tilting member 52 and the flat spring 54 by the stoppers 56, 56.

In the state where the fallable flag pole 51 is stood upright, as shown in FIG. 5, the flat spring 54 is in the state where a concave portion is formed. The tilting member 52 is pulled downward by the connecting rod 55 and which is in turn urged downwardly by a pulling force of the spring 54 so that the tilting member is securely fitted into the concave portion of the pedestal 53 and the force of the spring prevents the tilting member from wobbling.

Where the pole 8 impinges upon an obstacle, the fallable flag pole 51 and the tilting member 52 are pulled out of the concave portion of the pedestal 58 due to the principle of lever and pivots freely on the stopper 56 together with the pole 8, as shown in FIG. 6. At this time, the plate spring 54 is pulled upward by the connecting rod 55 and changes from the state where a concave portion is formed to the state where a convex portion is formed.

It is contemplated that when a tilted pole 8 is automatically stood upright again by the force of the return spring 4 as described above in relation to FIGS. 1-4, the pole 8 may hit the vehicle frame. However, the fallable type flag pole 51 shown in the third embodiment does not automatically return to an upright position, and can be suitably reset by a rider from the state shown in FIG. 6 to the state shown in FIG. 5 by pushing the tilting member 52 down into the concave portion of the pedestal 53.

According to desirable aspects of the present invention, the presently preferred embodiments of which are described above, even if the pole member mounted on the vehicle engages an obstacle, the pole supporting device prevents a great force from acting on the mounting side of the vehicle body because the supporting device itself is elastically deformable, thereby minimizing stress of the pole and improving durability of the pole. Furthermore, since the pole member is fastened to the vehicle body by the wire member or the connecting rod, the pole member is prevented from being lost.

The supporting device of the present invention is able to achieve the above advantages not only with respect to the flag pole as described above, but also with respect to any rod member, such as an antenna.

Although there has been described what are at present considered to be the preferred embodiments of the present invention, it will be understood that the invention can be embodied in other specific forms without departing from the spirit or essential characteristics thereof. The present embodiments are, therefore, to be considered in all aspects as illustrative, and not restrictive. The scope of the invention is indicated by the appended claims rather than the foregoing description.

I claim:

1. A supporting device for a pole, comprising:
   a mounting plate adapted to be horizontally mounted on an object, and having at least one hole defined therein;
   a pole;
   a tilting member integrally fixed to one end of said pole;
   a pedestal supported on an upper surface of said mounting plate, and said tilting member having a convex portion tiltably fitted to an upper surface of said pedestal;
   a cable having one end thereof integrally molded within said one end of said pole and an opposite end extending through said hole in said mounting plate;
   means for biasing said cable against a lower surface of said mounting plate;
   a protective boot fixed to the upper surface of said mounting plate and covering at least said convex portion of said tilting member;
   said biasing means comprising a compressional spring mounted to the lower surface of said mounting plate and pair of spring seats associated with opposite ends of said compressional spring, respectively; and
   auxiliary means for securing said spring to said mounting plate, said auxiliary securing means comprising a shaft fixed between at least one of said spring seats and said mounting plate.

2. A supporting device according to claim 1, wherein said mounting plate is adapted to be horizontally mounted on a frame of a vehicle.

3. A pole supporting device according to claim 1, wherein said mounting plate is adapted to have one end thereof mounted on said object such that an opposite end of the mounting plate is projected away from the object and said pedestal is supported on the upper surface of said opposite end of said mounting plate.

4. A pole supporting device according to claim 1, wherein said mounting plate is formed integrally with one of said spring seats as a unitary member.

5. A pole supporting device according to claim 1, wherein said mounting plate is formed integrally with said pedestal and one of said spring seats as a unitary member.

6. A pole supporting device according to claim 1, wherein said protective boot encloses said pedestal and a lower half portion of said tilting member.

7. A supporting device according to claim 1, wherein said stopper shaft is provided internally of said spring in the vicinity of said hole defined in said mounting plate.

8. A pole supporting device according to claim 1, wherein one of said spring seats is fixed to the lower surface of said mounting plate, and said shaft is fixed between the mounting plate and the other said spring seat.

* * * * *